United States Patent [19]

Schürmann

[11] Patent Number: 4,995,666

[45] Date of Patent: Feb. 26, 1991

[54] SUN ROOF

[75] Inventor: Erich Schürmann, Sendenhorst, Fed. Rep. of Germany

[73] Assignee: Gabel BmbH, Schwelm, Fed. Rep. of Germany

[21] Appl. No.: 433,042

[22] Filed: Nov. 6, 1989

[30] Foreign Application Priority Data

Nov. 22, 1988 [DE] Fed. Rep. of Germany ....... 3839403

[51] Int. Cl.⁵ .............................................. B60J 7/08
[52] U.S. Cl. ...................................... 296/216; 49/381
[58] Field of Search ...................... 296/216, 218, 224; 49/381

[56] References Cited

U.S. PATENT DOCUMENTS

| 2,173,890 | 9/1939 | Tuttle | 296/216 X |
| 4,183,576 | 1/1980 | Frymire | 296/212 |
| 4,363,191 | 12/1982 | Morgan | 49/381 |

Primary Examiner—Dennis H. Pedder
Attorney, Agent, or Firm—Herbert Dubno

[57] ABSTRACT

An openable roof assembly, especially for a sun-roof of an automotive vehicle has a single hinge mounting the translucent panel along one longitudinal edge to the frame and a single closure element at the opposite longitudinal edge of the panel so that the closure element and the hinge are provided along the surface centerline of the panel. In this way, indifferent zones between hinges are avoided and a uniform distribution of the closing force to the panel can be ensured.

11 Claims, 3 Drawing Sheets

4,995,666

SUN ROOF

CROSS REFERENCE TO RELATED APPLICATIONS

This application is related to my concurrently filed copending patent application Ser. No. 07/433,041, based upon German Application No. P 38 39 402.2.

FIELD OF THE INVENTION

My present invention relates to a movable roof assembly for an automotive vehicle and especially a sun roof. More particularly, the invention relates to an assembly which can be built into the roof structure of an automotive vehicle and has a panel, preferably a transparent or translucent panel, which can be opened outwardly from a frame in which the panel is received The panel can be composed of glass or the like.

BACKGROUND OF THE INVENTION

An assembly having a roof part which is displaceable out of a frame is disclosed, for example, in European Patent Publication No. EP 0 059 859.

In this system, the roof part which can be displaced out of the frame has two outer edges spaced apart in the travel direction. One of these longitudinal edges is formed with two spaced apart hinge joints connecting it to the frame and disposed mirror symmetrically on opposite sides of a median plane perpendicular to the surface of the panel and, of course, to the centerline of this surface.

Along this centerline and at the opposite outer edge of the panel there is provided a locking or closure element by means of which the panel can be drawn sealingly against the frame structure This element can also be formed as a mechanism enabling the respective edge of the panel to be raised above the frame to open the roof. The closure element can be a toggle closure or the like.

The roof panel in the conventional roof assembly is generally outwardly convex. In order to ensure a uniform traction and watertight engagement of the panel on the ceiling strip or bead surrounding the roof opening, the panel closure element must apply extremely high closing forced when the panel is brought into its closed position. These forces must be sufficient to cause the panel in its closed position to flatten with elastic deformation and lie flat against the peripheral seal.

OBJECTS OF THE INVENTION

It is, therefore, the principal object of the present invention to provide an improved roof assembly for an automotive vehicle having a panel which can be tilted out of the frame, which can be sealingly closed with reduced closure forces, provide a more reliable sealing action and have a lower cost with improved sealing effectiveness than earlier assemblies of this type.

Another object of the present invention is to provide an improved openable roof assembly for an automotive vehicle, especially a sun roof, whereby the drawbacks of the earlier system described can be obviated.

SUMMARY OF THE INVENTION

These objects and others which will become more readily apparent hereinafter are attained, in accordance with the present invention, in a roof assembly for the purposes described, which comprises:

a frame formed in a roof of an automotive vehicle;
a panel movably mounted in the frame and having a pair of opposite edges;
a single hinge mounted on the panel at a midpoint of one of the edges and constituting a sole hinged pivoting articulation between the panel and the frame; and
a panel-closing element for retaining the panel in a closed position located on the panel at a midpoint of the other of the edges whereby the hinge and the panel-closing element lie along a surface centerline of the panel.

In short, the improved results are obtained with a single hinge on the first longitudinal edge of the panel disposed along the surface centerline thereof opposite the closure element and, particularly, in a system in which both the hinge and the closure element are provided on a common strip bonded adhesively to the inner surface of the panel which may be translucent or transparent, e.g. is composed of glass.

Whereas European Patent Document No. EP 0 059 859 describes a roof assembly having two distinct hinge units and a panel closure unit as three distinct assemblies, the roof assembly of the invention has only a single hinge unit and along the surface centerline of the panel, the panel closure element or unit, i.e. only two units.

As a consequence, the closing force is transmitted or distributed along the surface centerline of the panel and, by comparison with the prior art technique, has an ideal uniform distribution of the closing force all around the periphery, i.e. the closing gap. As a consequence, there is a uniform pressing action between the panel inner edge and the sealing strip.

With the system of the invention, therefore, an indifferent pressing zone of the type which exists between the two hinges of the prior art device can be completely avoided.

According to a further feature of the invention, the strip carrying the single hinge and a closure element extends substantially between the opposite edges previously defined along the surface centerline and is formed at one end region with a hinge and at the opposite end region with the closure element.

While this strip can be a one piece or multipartite strip, e.g. can be longitudinally or transversely subdivided, a one piece strip has been found to be especially advantageous.

The two units, namely, the hinge and the panel closure element can be previously formed on or mounted on the strip so as to form a unit therewith.

According to an important feature of the invention, the strip is adhesively connected to the inner surface of the panel, i.e. is bonded thereto with an adhesive layer. The adhesive bonding can be used as an exclusive form of connection or in combination with additional fastening means, e.g. fastening screws. An exclusively adhesive connection has been found to be especially advantageous because it provides a homogeneous external appearance which is not disturbed by fastening elements such as screw heads or the like.

Advantageously, the strip is composed of a flat sheet material, for example, a synthetic resin (plastic) or a metal, especially a light metal such as aluminum, magnesium or alloys thereof, or steel sheet.

According to another feature of the invention, the strip has zones which alternate with one another of different bending stiffness along the length thereof.

In accordance with this latter aspect of the invention, zones of low bending stiffness are provided between zones of higher bending stiffness defined by longitudinal corrugations projecting inwardly from the strip.

The more readily bent zones can be undeformed, i.e. corrugation-free, or can be weakened, e.g. by being thinned or perforated.

I have found that this feature is especially important in the case of adhesive bonding of the strip with the inner surface of the panel. In a case in which the adhesive bonding tends to loosen, e.g. adjacent the closure element, the provision of weakened or perforated non-corrugated zones of greater bendability ensures that the adhesive bond will not break in these regions As a consequence, at least in the regions of low bending stiffness, the strip is retained on the panel and function is ensured at least until the assembly can be brought to a repair facility.

In a present embodiment of the invention, the corrugations at the ends of the strip are provided in a U-shaped pattern and the U-shaped patterns open toward one another and are spaced from longitudinal corrugations intermediate the end zones with the regions between the longitudinal corrugations and the U-shaped corrugations constituting the more readily bendable regions.

Most advantageously, the strip is mirror symmetrical about its longitudinal median axis.

BRIEF DESCRIPTION OF THE DRAWING

The above objects, features and advantages of my invention will become more readily apparent from the following description, reference being made to the accompanying drawing in which.

SPECIFIC DESCRIPTION

Figure 1:
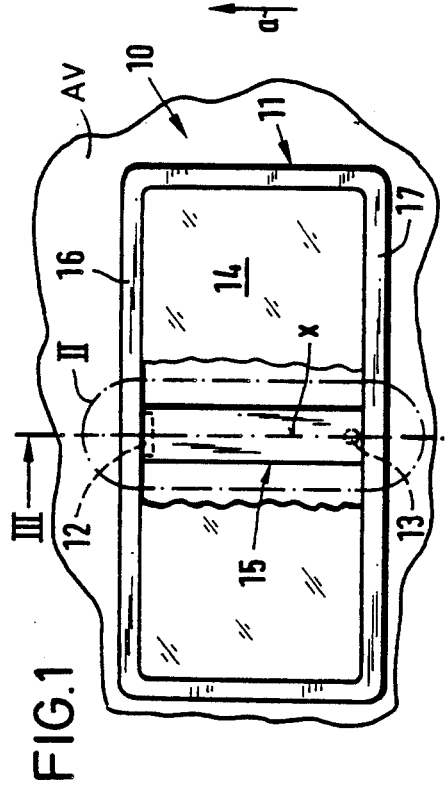
FIG. 1 is a schematic plan view of a panel of an assembly for the roof of an automotive vehicle of the type in which the panel can be tilted outwardly in accordance with the invention.
Figure 2:
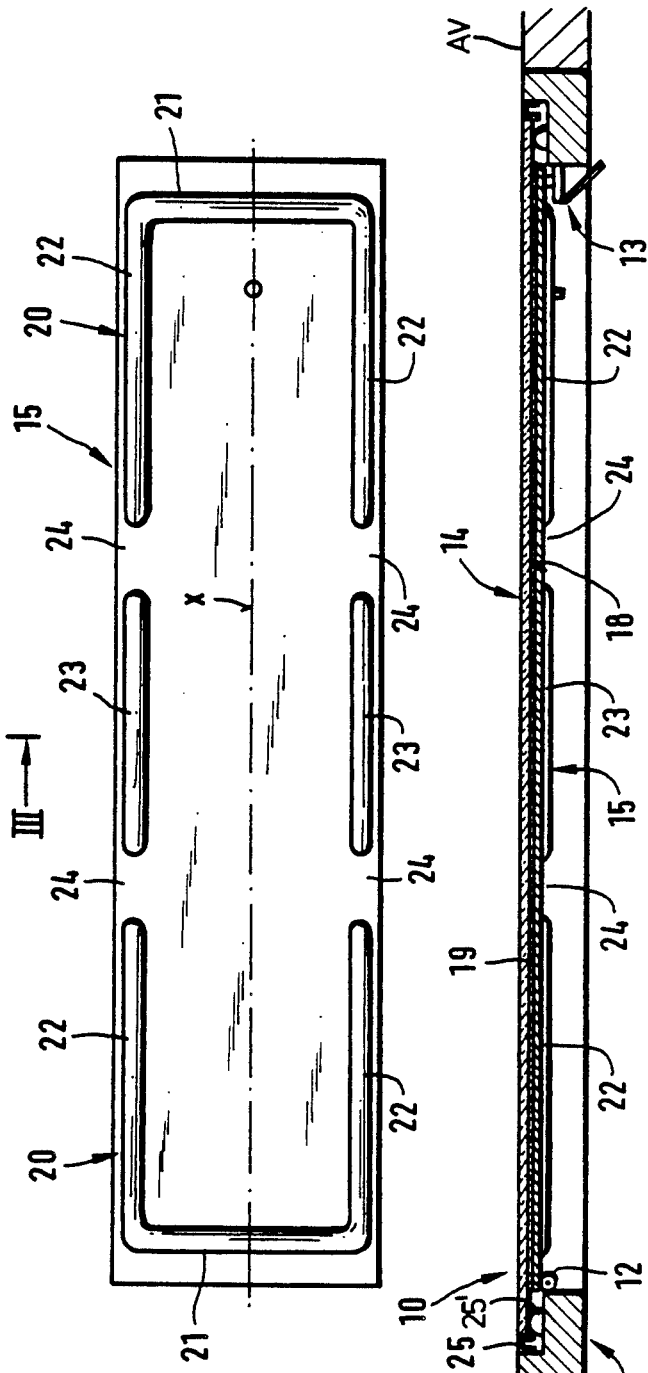
FIG. 2 is a detail view of the region outlined in dot-dash lines and represented at II in FIG. 1, drawn to a larger scale, the strip shown without the hinge or panel closure element.
Figure 3:
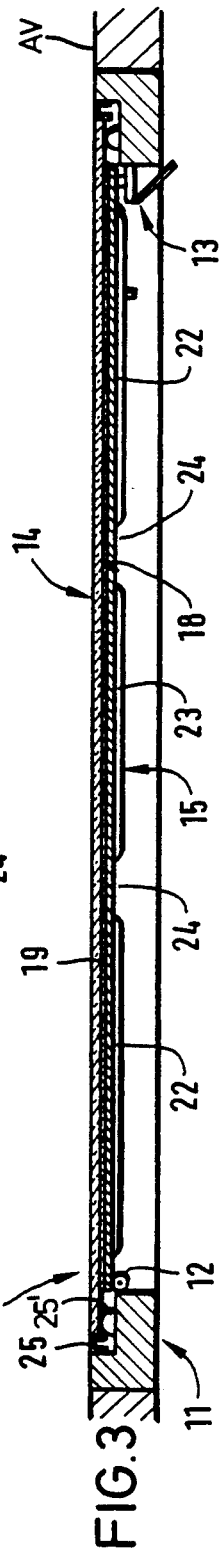
FIG. 3 is a transverse section taken along the surface centerline of the panel through a roof assembly according to the invention and generally along the section line III—III of FIG. 1.

The panel which can be tilted from the automotive vehicle which is shown only diagrammatically by the extension AV of the wall in FIG. 3, has been represented at 10 in FIGS. 1–5. The panel 10 comprises a glass pane 14 which is displaceable in a one-part or multipartite roof frame 11 an comprises a translucent material such as glass or a polycarbonate.

Figure 4:
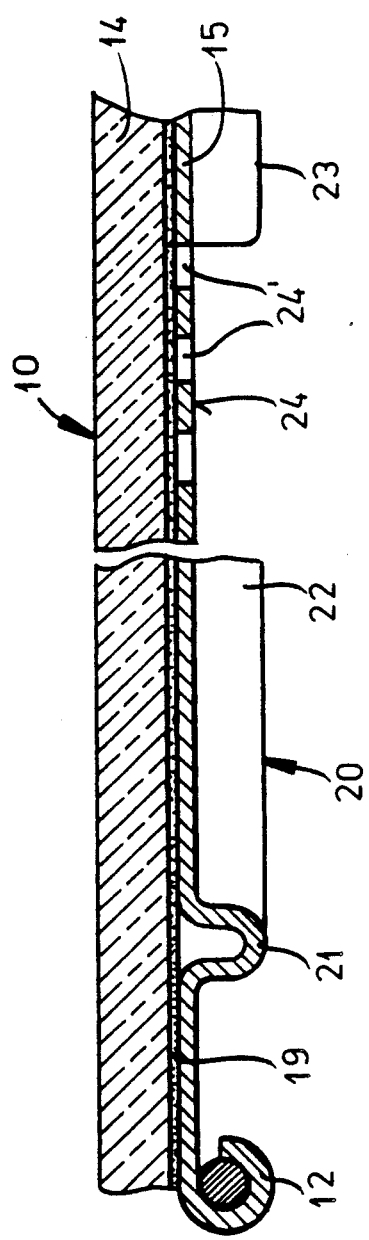
FIG. 4 is a detail view of the hinge end of the strip showing its connection to the glass pane forming the panel.
Figure 5:
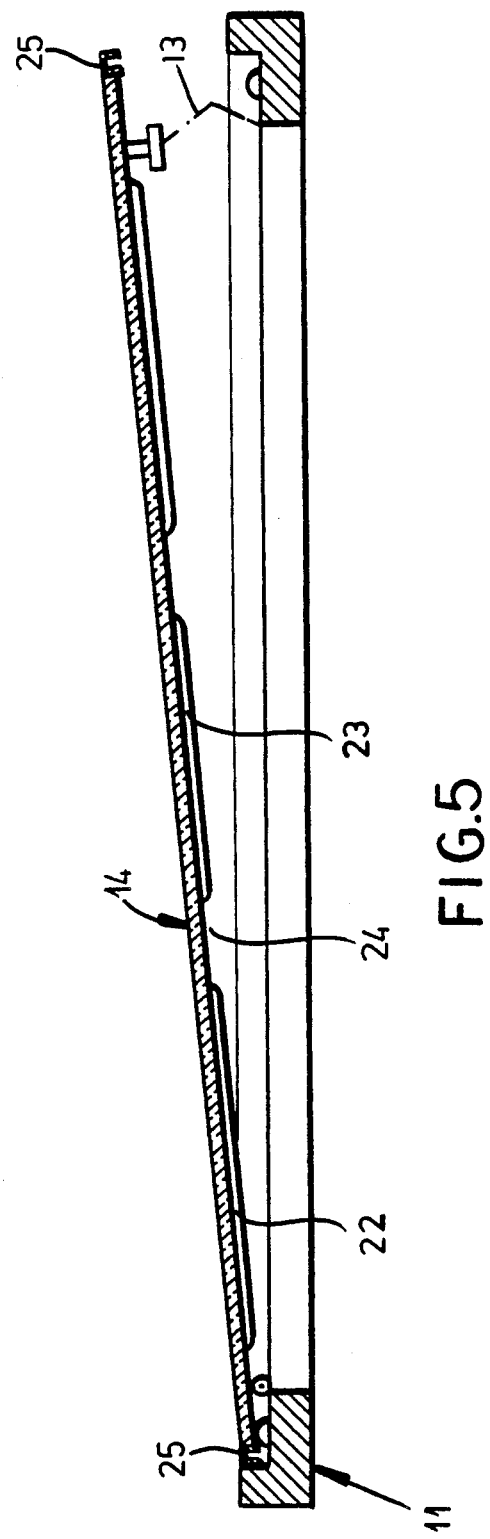
FIG. 5 is a section similar to FIG. 4 but showing the panel tilted upwardly.

To retain the panel 14, a single hinge 12 shown in broken lines in FIG. 1 and in greater detail in FIG. 4 is provided between the left-hand limb of the frame 11 as seen in FIGS. 3 and 5 and the panel. The hinge 12 is provided substantially along the leading edge of the panel in the direction of travel a of the vehicle.

At the trailing edge of the panel, a panel closure element 13 is provided This panel closure element has been shown only in broken lines in FIG. 1 and diagonally in FIGS. 3 and 5. Any closure element commonly used for tiltable panels can be employed here as well (see the aforementioned European Patent Document). The hinge 12 and the panel closure element 13 are mirror symmetrical with respect to a surface centerline designated at x of the panel and also representing the centerline of a flat strip 15 adhesively bonded by an adhesive layer 19 to the inner surface of the panel.

The leading edge of the panel 14 is designated at 16 while the trailing edge of the panel is designated at the reference numeral 17 in FIG. 1.

The strip 15 is preferably composed of sheet steel or a light metal sheet material bonded by the adhesive layer 19 to the inner surface 18 of the panel 14 over its entire surface area juxtaposed with the panel.

Each end region of the strip 15 is provided with a U-shaped corrugation 20 formed in the strip (see FIG. 4) and consisting of a transverse corrugation 21 and a pair of longitudinal corrugations 22.

The U-shaped patterns of these corrugations 20 open toward one another as can be seen from FIG. 2.

In the central region of the strip 15, a pair of opposite longitudinal corrugations 23 are provided so that the longitudinal corrugations 22 are separated by low bending stiffness zones 24 from the longitudinal corrugations 23.

All of the corrugations are convex inwardly and project inwardly from the strip.

The zones 24' can be provided with perforations 24 (FIG. 4) to further render them readily bendable. They can also be weakened by thickness reduction transverse to the axis x.

FIGS. 3 and 5, if compared, show that the panel 14 can be tilted outwardly and, upon clamping of the closure 13 can cause the panel 12 to bear against the sealing strips 25 and 25' provided on the frame.

Figure 6:
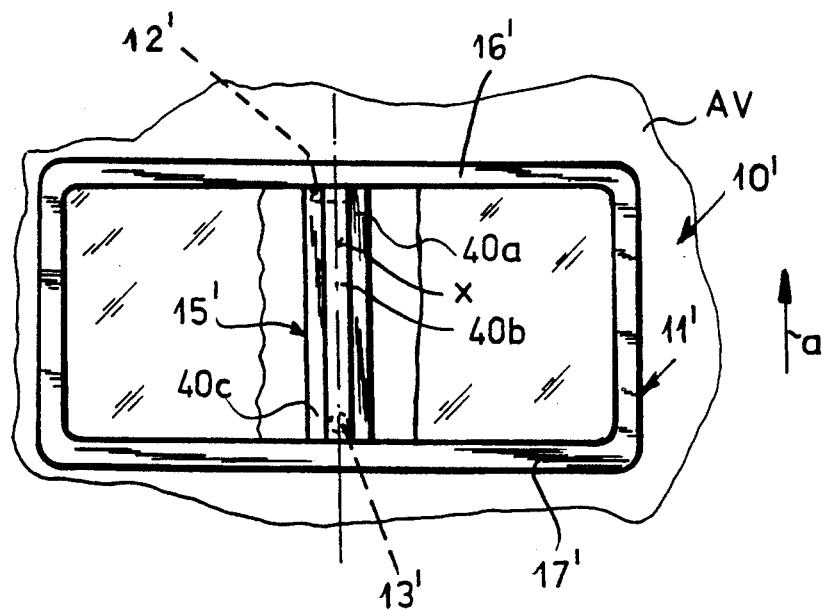
FIG. 6 is a schematic plan view similar to FIG. 1 but showing a longitudinally divided strip.
Figure 7:
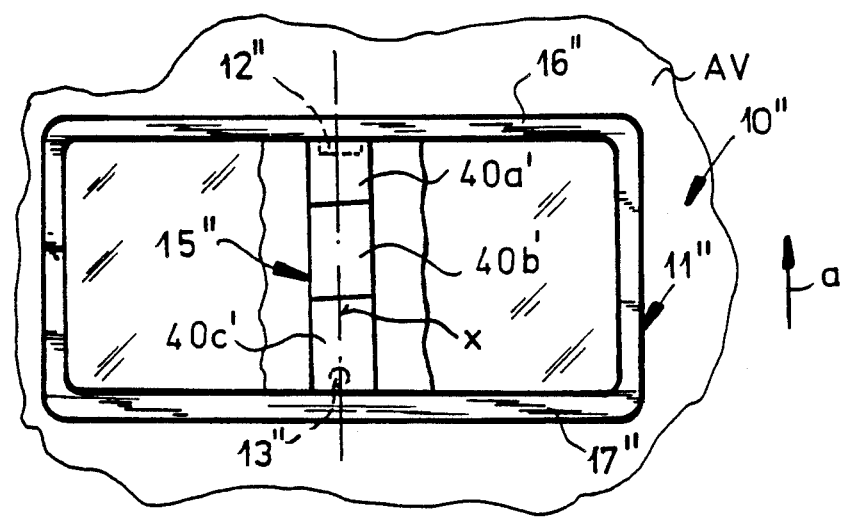
FIG. 7 is a schematic plan view similar to FIG. 1 but showing a tranversally divided strip.

FIG. 6 illustrates strip 15' divided longitudinally into a set of smaller strips 40a, 40b and 40c. FIG. 7 illustrates strip 15" divided transversely into strips 40a', 40b' and 40c'. Other numerated elements of FIGS. 6 and 7 are equivalent to those of FIG. 1.

I claim:
1. An openable sun roof assembly for an automotive vehicle, comprising:
   a frame formed in a roof of an automotive vehicle;
   a translucent panel movably mounted in said frame, said panel having an inner surface turned toward an interior of said vehicle and having a pair of opposite edges;
   a single hinge mounted on said panel at a midpoint of one of said edges and constituting a sole hinged pivoting articulation between said one edge and said frame;
   a panel-closing element for retaining said panel in a closed position located on said panel at a midpoint of the other of said edges whereby said hinge and said panel-closing element lie along a surface centerline of said panel; and
   an elongated strip of material fixed to said inner surface along said centerline and formed at one end with said hinge and at an opposite end with said panel-closing element, said strip being adhesively bonded to said inner surface by a layer of an adhe- sive, and said strip being formed along a length thereof with zones alternating with one another and having different bending stiffnesses.

2. The assembly defined in claim 1 wherein said strip is constituted of a single piece of said material.

3. The assembly defined in claim 1 wherein said strip is constituted homogeneously of said material and said material is selected from the group which consists of a plastic, a light metal, and a sheet steel.

4. The assembly defined in claim 3 wherein said strip is constituted of light metal selected from the group consisting of aluminum, magnesium and alloys thereof.

5. The assembly defined in claim 1 wherein said zones include zones of high bending stiffness formed with inwardly projecting corrugations and zones of low bending stiffness.

6. The assembly defined in claim 5 wherein said zones of low bending stiffness are corrugation-free zones.

7. The assembly defined in claim 5 wherein said zones of low bending stiffness are weakened zones of said strip.

8. The assembly defined in claim 6 wherein said zones of high bending stiffness include terminal zones at opposite ends of said strip having U-shaped corrugations with the U-shapes of the corrugations opening toward one another, an intermediate zone having longitudinal corrugations along opposite edges of said strip and spaced from said U-shaped corrugations by said corrugation-free zones.

9. The assembly defined in claim 8 wherein said strip is mirror symmetrical about a longitudinal median axis of the strip.

10. An openable sun roof assembly for an automotive vehicle, comprising:
a frame formed in a roof of an automotive vehicle;
a translucent panel movably mounted in said frame, said panel having an inner surface turned toward an interior of said vehicle and having a pair of opposite edges;
a single hinge mounted on said panel at a midpoint of one of said edges and constituting a sole hinged pivoting articulation between said one edge and said frame;
a panel-closing element for retaining said panel in a closed position located on said panel at a midpoint of the other of said edges whereby said hinge and said panel-closing element lie along a surface centerline of said panel; and
an elongated strip of material affixed to said inner surface along said centerline and formed at one end with said hinge and at an opposite end with said panel-closing element, said strip being constituted of a plurality of pieces of said material subdivided longitudinally.

11. An openable sun roof assembly for an automotive vehicle, comprising:
a frame formed in a roof of an automotive vehicle;
a translucent panel movably mounted in said frame, said panel having an inner surface turned toward an interior of said vehicle and having a pair of opposite edges;
a single hinge mounted on said panel at a midpoint of one of said edges and constituting a sole hinged pivoting articulation between said one edge and said frame;
a panel-closing element for retaining said panel in a closed position located on said panel at a midpoint of the other of said edges whereby said hinge and said panel-closing element lie along a surface centerline of said panel; and
an elongated strip of material affixed to said inner surface along said centerline and formed at one end with said hinge and at an opposite end with said panel-closing element, said strip being constituted of a plurality of pieces of said material subdivided transversally.

* * * * *